US012628238B2

(12) United States Patent (10) Patent No.: US 12,628,238 B2
Godin et al. (45) Date of Patent: May 12, 2026

(54) SMALL DATA TRANSMISSION PROCEDURE TERMINATION

(71) Applicant: Nokia Technologies Oy, Espoo (FI)

(72) Inventors: Philippe Godin, Massy (FR); Daniela Laselva, Aalborg (DK); Subramanya Chandrashekar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 384 days.

(21) Appl. No.: 18/256,313

(22) PCT Filed: Dec. 2, 2021

(86) PCT No.: PCT/EP2021/083872
§ 371 (c)(1),
(2) Date: Jun. 7, 2023

(87) PCT Pub. No.: WO2022/128489
PCT Pub. Date: Jun. 23, 2022

(65) Prior Publication Data
US 2024/0057201 A1 Feb. 15, 2024

(30) Foreign Application Priority Data
Dec. 16, 2020 (FI) ...................................... 20206308

(51) Int. Cl.
*H04W 76/27* (2018.01)
*H04W 76/30* (2018.01)
(52) U.S. Cl.
CPC ........... *H04W 76/27* (2018.02); *H04W 76/30* (2018.02)

(58) Field of Classification Search
CPC ........ H04W 76/27; H04W 76/30; H04W 4/70
See application file for complete search history.

(56) References Cited

U.S. PATENT DOCUMENTS

2018/0139778 A1 5/2018 Chou et al.
2018/0227851 A1 8/2018 Kubota et al.
(Continued)

FOREIGN PATENT DOCUMENTS

WO 2013/008208 A1 1/2013
WO 2016/064458 A1 4/2016
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.
(Continued)

*Primary Examiner* — Will W Lin
(74) *Attorney, Agent, or Firm* — Barta Jones, PLLC

(57) ABSTRACT

Devices, methods and computer programs for small data transmission, SDT, transaction termination are disclosed. A client device determines whether an ongoing small data transmission, SDT, transaction comprising one or more uplink, UL, small data transmissions with a control plane network node device is to be terminated. If yes, a radio resource control, RRC, message comprising termination information related to the determined termination of the ongoing SDT transaction is forwarded from the client device to the control plane network node device.

3 Claims, 6 Drawing Sheets

(56) References Cited

U.S. PATENT DOCUMENTS

| | | | | |
|---|---|---|---|---|
| 2020/0037210 | A1* | 1/2020 | Rugeland | H04W 12/106 |
| 2020/0037345 | A1 | 1/2020 | Ryoo et al. | |
| 2022/0046749 | A1* | 2/2022 | Lin | H04W 76/30 |
| 2023/0087615 | A1* | 3/2023 | Park | H04W 72/231 |
| | | | | 370/329 |
| 2023/0380003 | A1* | 11/2023 | Agiwal | H04W 72/21 |
| 2024/0015689 | A1* | 1/2024 | Tseng | H04W 4/029 |

FOREIGN PATENT DOCUMENTS

| | | | |
|---|---|---|---|
| WO | 2018/142207 | A1 | 8/2018 |
| WO | 2019/217829 | A1 | 11/2019 |
| WO | 2020/034560 | A1 | 2/2020 |
| WO | 2020/088382 | A1 | 5/2020 |
| WO | 2020/148483 | A1 | 7/2020 |
| WO | 2020/221861 | A1 | 11/2020 |
| WO | 2022/074502 | A1 | 4/2022 |
| WO | 2022/078867 | A1 | 4/2022 |
| WO | 2022/083921 | A1 | 4/2022 |

OTHER PUBLICATIONS

"3rd Generation Partnership Project; Technical Specification Group Radio Access Network; NG-RAN; F1 application protocol (F1AP) (Release 16)", 3GPP TS 38.473, V16.3.1, Oct. 2020, pp. 1-455.

"3rd Generation Partnership Project; Technical Specification Group Radio Access Network; NG-RAN; E1 Application Protocol (E1AP) (Release 16)", 3GPP TS 38.463, V16.3.0, Sep. 2020, pp. 1-235.

"3rd Generation Partnership Project; Technical Specification Group Radio Access Network; NG-RAN; Xn application protocol (XnAP) (Release 16)", 3GPP TS 38.423, V16.3.0, Sep. 2020, pp. 1-451.

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.

"SDT mechanism on RRC/non-RRC based approaches and RACH requirements", 3GPP TSG RAN WG2 Meeting #111-e, R2-2006713, Agenda: 8.6.2, Intel Corporation, Aug. 17-28, 2020, 10 pages.

"Radio bearer configuration for SDT considering UE context relocation and CU/DU split", 3GPP TSG RAN WG2 Meeting #111-e, R2-2006714, Agenda: 8.6.2, Intel Corporation, Aug. 17-28, 2020, 6 pages.

"3rd Generation Partnership Project; Technical Specification Group Radio Access Network; NG-RAN Architecture description (Release 16)", 3GPP TS 38.401, V16.3.0, Sep. 2020, pp. 1-78.

"Summary of email discussion [Post111-e][926][SmallData] Context Fetch", 3GPP TSG-RAN WG2 Meeting #112-e, R2-2009967, Agenda: 8.6.3, Ericsson, Nov. 2-13, 2020, pp. 1-22.

Ryoo et al., "Energy efficiency enhancement with RRC connection control for 5G new RAT", IEEE Wireless Communications and Networking Conference (WCNC), Apr. 15-18, 2018, 6 pages.

Office action received for corresponding Finnish Patent Application No. 20206308, dated May 20, 2021, 7 pages.

"SDT aspects common for RACH-based and CG-based SDT scheme", 3GPP TSG-RAN WG2 #112-e, R2-2009930, Agenda: 8.6.3, Huawei, Nov. 2-13, 2020, 17 pages.

Office action received for corresponding Finnish Patent Application No. 20206308, dated Nov. 25, 2021, 6 pages.

International Search Report and Written Opinion received for corresponding Patent Cooperation Treaty Application No. PCT/EP2021/083872, dated Mar. 3, 2022, 12 pages.

"Report of email discussion: [96#31][NR] UL data in inactive solution B", 3GPP TSG-RAN WG2 NR Adhoc Meeting, R2-1700626, Agenda: 3.2.2.2, Ericsson, Jan. 17-19, 2017, 28 pages.

* cited by examiner

200

310

SMALL DATA TRANSMISSION PROCEDURE TERMINATION

RELATED APPLICATION

This application claims priority to PCT Application No. PCT/EP2021/083872, filed on Dec. 2, 2021, which claims priority from FI application No. 20206308, filed on Dec. 16, 2020, each of which is incorporated herein by reference in its entirety.

TECHNICAL FIELD

The disclosure relates generally to communications and, more particularly but not exclusively, to small data transmission procedure termination.

BACKGROUND

In cellular communication networks, a radio access network (RAN) architecture can nowadays be split into centralized baseband units and distributed radio units, allowing both performance and cost benefits.

Fifth generation (5G) new radio (NR) wireless networks allow so called small data transmissions (SDTs) to convey packet data transmissions while a client device is in a radio resource control (RRC) inactive state. Furthermore, it is possible for a user equipment (UE) to send multiple uplink and/or downlink small data transmissions subsequent to a first uplink small data transmission without transitioning the UE to an RRC connected state, i.e. as part of a same SDT procedure or transaction.

However, for a radio access network architecture split into centralized baseband units and distributed radio units, at least in some situations it may not be possible to terminate an ongoing SDT transaction comprising one or multiple small data transmissions.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor and at least one memory including computer program code. The at least one memory and the computer program code are configured to, with the at least one processor, cause the client device to at least perform:

determining whether an ongoing small data transmission, SDT, transaction comprising one or more uplink, UL, small data transmissions with a control plane network node device is to be terminated; and in response to determining that the ongoing SDT transaction is to be terminated, forwarding to the control plane network node device a radio resource control, RRC, message comprising termination information related to the determined termination of the ongoing SDT transaction.

In an example embodiment, alternatively or in addition to the above-described example embodiments, the termination information comprises one of an SDT termination preference or an SDT termination indication.

In an example embodiment, alternatively or in addition to the above-described example embodiments, the at least one memory and the computer program code are further configured to, with the at least one processor, cause the client device to perform the sending of the RRC message by one of: sending the RRC message with the last UL small data transmission of the ongoing SDT transaction or sending the RRC message on its own.

In an example embodiment, alternatively or in addition to the above-described example embodiments, the at least one memory and the computer program code are further configured to, with the at least one processor, cause the client device to at least perform differentiating the RRC message sent to indicate the termination of the ongoing SDT transaction via a message type used for the RRC message or via inclusion of additional termination information in the RRC message.

In an example embodiment, alternatively or in addition to the above-described example embodiments, the RRC message comprises a UEAssistanceInformation message.

In an example embodiment, alternatively or in addition to the above-described example embodiments, the at least one memory and the computer program code are further configured to, with the at least one processor, cause the client device to perform the determining of whether the ongoing SDT transaction is to be terminated based on at least one of: buffer status information, running applications information, or small data transmissions historical information.

In an example embodiment, alternatively or in addition to the above-described example embodiments, the at least one memory and the computer program code are further configured to, with the at least one processor, cause the client device to at least perform:

receiving an RRC release message from the control plane network node device after sending the RRC message comprising the termination information; and initiating a transition of the client device to an inactive state of RRC.

An example embodiment of a client device comprises means for performing:

determining whether an ongoing small data transmission, SDT, transaction comprising one or more uplink, UL, small data transmissions with a control plane network node device is to be terminated; and in response to determining that the ongoing SDT transaction is to be terminated, causing the client device to forward to the control plane network node device a radio resource control, RRC, message comprising termination information related to the determined termination of the ongoing SDT transaction.

An example embodiment of a method comprises:

determining, by a client device, whether an ongoing small data transmission, SDT, transaction comprising one or more uplink, UL, small data transmissions with a control plane network node device is to be terminated; and in response to determining that the ongoing SDT transaction is to be terminated, forwarding from the client device to the control plane network node device a radio resource control, RRC, message comprising termination information related to the determined termination of the ongoing SDT transaction.

In an example embodiment, alternatively or in addition to the above-described example embodiments, the termination information comprises one of an SDT termination preference or an SDT termination indication.

In an example embodiment, alternatively or in addition to the above-described example embodiments, the sending of the RRC message is performed by one of: sending the RRC message with the last UL small data transmission of the ongoing SDT transaction or sending the RRC message on its own.

In an example embodiment, alternatively or in addition to the above-described example embodiments, the RRC message sent to indicate the termination of the ongoing SDT transaction is differentiated via a message type used for the RRC message or via inclusion of additional termination information in the RRC message.

In an example embodiment, alternatively or in addition to the above-described example embodiments, the RRC message comprises a UEAssistanceInformation message.

In an example embodiment, alternatively or in addition to the above-described example embodiments, the determining of whether the ongoing SDT transaction is to be terminated is performed based on at least one of: buffer status information, running applications information, or small data transmissions historical information.

In an example embodiment, alternatively or in addition to the above-described example embodiments, the method further comprises:

> receiving at the client device an RRC release message from the control plane network node device after sending the RRC message comprising the termination information; and > initiating, by the client device, a transition of the client device to an inactive state of RRC.

An example embodiment of a computer program comprises instructions for causing a client device to perform at least the following:

> determining whether an ongoing small data transmission, SDT, transaction comprising one or more uplink, UL, small data transmissions with a control plane network node device is to be terminated; and > in response to determining that the ongoing SDT transaction is to be terminated, forwarding to the control plane network node device a radio resource control, RRC, message comprising termination information related to the determined termination of the ongoing SDT transaction.

An example embodiment of a control plane network node device comprises at least one processor, and at least one memory including computer program code. The at least one memory and the computer program code are configured to, with the at least one processor, cause the control plane network node device to at least perform:

> receiving from a client device a radio resource control, RRC, message comprising termination information related to termination of an ongoing small data transmission, SDT, transaction comprising one or more uplink, UL, small data transmissions with the client device; and > initiating a termination procedure to terminate the ongoing SDT transaction based on the received termination information.

In an example embodiment, alternatively or in addition to the above-described example embodiments, the termination procedure comprises one of: generating and sending an RRC release message to the client device, sending a resource release indication to a user plane network node device associated with the control plane network node device, or triggering a last serving control plane network node device to generate and send the RRC release message to the client device due to the termination of the ongoing SDT transaction.

In an example embodiment, alternatively or in addition to the above-described example embodiments, the triggering of the last serving control plane network node device comprises one of: sending to the last serving control plane network node device an inter-CU-CP message including the RRC message received from the client device, or sending to the last serving control plane network node device an inter-CU-CP message including an indication of the termination of the ongoing SDT transaction.

In an example embodiment, alternatively or in addition to the above-described example embodiments, the RRC release message to the client device comprises suspend information, and the at least one memory and the computer program code are further configured to, with the at least one processor, cause the control plane network node device to perform the sending of the RRC release message by sending the RRC release message in a CU-DU interface message to a network node device distributed unit associated with the control plane network node device for forwarding to the client device, wherein the CU-DU interface message indicates at least one of the release of a context in downlink or the termination of the ongoing SDT transaction.

In an example embodiment, alternatively or in addition to the above-described example embodiments, the termination information comprises one of an SDT termination preference or an SDT termination indication.

In an example embodiment, alternatively or in addition to the above-described example embodiments, the at least one memory and the computer program code are further configured to, with the at least one processor, cause the control plane network node device to perform the receiving of the RRC message by one of: receiving the RRC message with the last UL small data transmission of the ongoing SDT transaction or receiving the RRC message on its own.

In an example embodiment, alternatively or in addition to the above-described example embodiments, the RRC message received to indicate the termination of the ongoing SDT transaction is differentiated via a message type used for the RRC message or via inclusion of additional termination information in the RRC message.

In an example embodiment, alternatively or in addition to the above-described example embodiments, the RRC message comprises a UEAssistanceInformation message.

An example embodiment of a control plane network node device comprises means for performing:

> causing the control plane network node device to receive from a client device a radio resource control, RRC, message comprising termination information related to termination of an ongoing small data transmission, SDT, transaction comprising one or more uplink, UL, small data transmissions with the client device; and > initiating a termination procedure to terminate the ongoing SDT transaction based on the received termination information.

An example embodiment of a method comprises:

> receiving, at a control plane network node device from a client device a radio resource control, RRC, message comprising termination information related to termination of an ongoing small data transmission, SDT, transaction comprising one or more uplink, UL, small data transmissions with the client device; and > initiating, by the control plane network node device, a termination procedure to terminate the ongoing SDT transaction.

In an example embodiment, alternatively or in addition to the above-described example embodiments, the termination procedure comprises one of: generating and sending an RRC release message to the client device, sending a resource release indication to a user plane network node device associated with the control plane network node device, or triggering a last serving control plane network node device to generate and send the RRC release message to the client device due to the termination of the ongoing SDT transaction.

In an example embodiment, alternatively or in addition to the above-described example embodiments, the triggering of the last serving control plane network node device comprises one of: sending to the last serving control plane network node device an inter-CU-CP message including the RRC message received from the client device, or sending to the last serving control plane network node device an inter-CU-CP message including an indication of the termination of the ongoing SDT transaction.

In an example embodiment, alternatively or in addition to the above-described example embodiments, the RRC release message to the client device comprises suspend information, and the sending of the RRC release message is performed by sending the RRC release message in a CU-DU interface message to a network node device distributed unit associated with the control plane network node device for forwarding to the client device, wherein the CU-DU interface message indicates at least one of the release of a context in downlink or the termination of the ongoing SDT transaction.

In an example embodiment, alternatively or in addition to the above-described example embodiments, the termination information comprises one of an SDT termination preference or an SDT termination indication.

In an example embodiment, alternatively or in addition to the above-described example embodiments, the receiving of the RRC message is performed by one of: receiving the RRC message with the last UL small data transmission of the ongoing SDT transaction or receiving the RRC message on its own.

In an example embodiment, alternatively or in addition to the above-described example embodiments, the RRC message received to indicate the termination of the ongoing SDT transaction is differentiated via a message type used for the RRC message or via inclusion of additional termination information in the RRC message.

In an example embodiment, alternatively or in addition to the above-described example embodiments, the RRC message comprises a UEAssistanceInformation message.

An example embodiment of a computer program comprises instructions for causing a control plane network node device to perform at least the following:

receiving from a client device a radio resource control, RRC, message comprising termination information related to termination of an ongoing small data transmission, SDT, transaction comprising one or more uplink, UL, small data transmissions with the client device; and initiating a termination procedure to terminate the ongoing SDT transaction.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
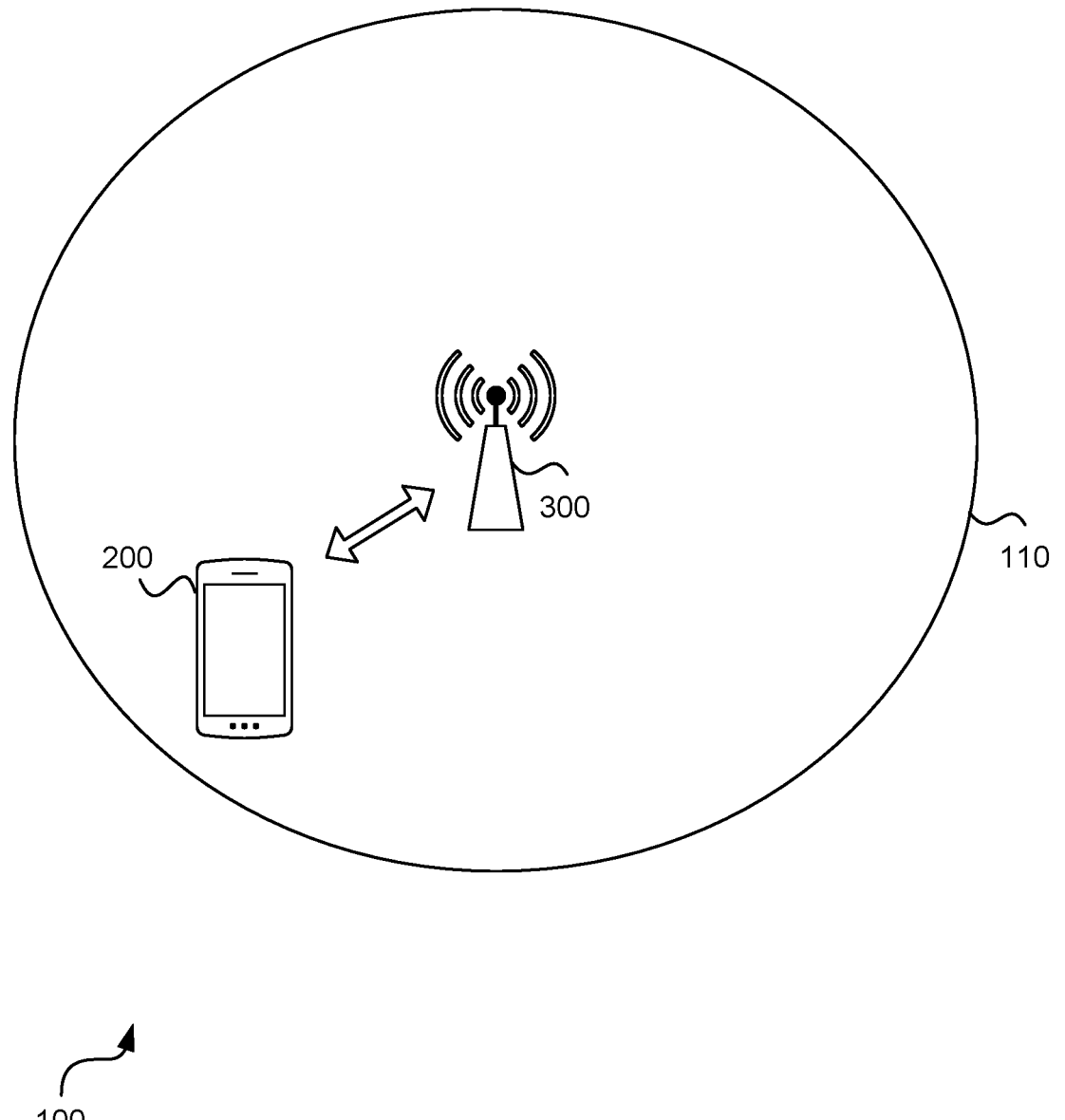
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a fifth generation (5G) new radio (NR) network 110. An example representation of the system 100 is shown depicting a client device 200 and a network node device 300. At least in some embodiments, the 5G NR network 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/or the like. In other words, the 5G NR network 110 may be configured to serve diverse service types and/or use cases, and may logically be seen as comprising one or more networks.

Small data transmissions (SDTs) may be used in the 5G NR wireless network 110 to convey packet data transmissions while the client device 200 is in an inactive state of RRC. An SDT can be used during the RRC inactive state without need for a state transition to a connected state of RRC. Herein, RRC states include the connected state of RRC, an idle state of RRC, and the inactive state of RRC. For example, the inactive state of RRC may comprise RRC_INACTIVE state of 5G NR, the idle state of RRC may comprise RRC_IDLE state of 5G NR, and the connected state of RRC may comprise RRC_CONNECTED state of 5G NR. The RRC_INACTIVE state of 5G NR is designed to complement the existing states, RRC_CONNECTED and RRC_IDLE, with the goal of lean signaling and energy-efficient support of NR services. The RRC_INACTIVE state allows to more quickly resume the connection and start the transmission of small or sporadic data with a much lower initial access delay and associated signaling overhead as compared to the RRC_IDLE state. This is achieved e.g. via reduced control signaling required for requesting and obtaining the resumption of a suspended RRC connection, which results in UE power saving. At the same time, a UE in RRC_INACTIVE is able to achieve similar power savings as in RRC_IDLE, benefiting from e.g. a much larger period of physical downlink control channel (PDCCH) monitoring (e.g. paging) and relaxed measurements compared to RRC_CONNECTED.

The client device 200 may include e.g. a mobile phone, a smartphone, a tablet computer, a smart watch, or any hand-held or portable device. The client device 200 may also be referred to as a user equipment (UE). The network node device 300 may be a base station. The base station may include e.g. a fifth-generation base station (gNB) or any such device suitable for providing an air interface for client devices to connect to a wireless network via wireless transmissions.

Figure 3:
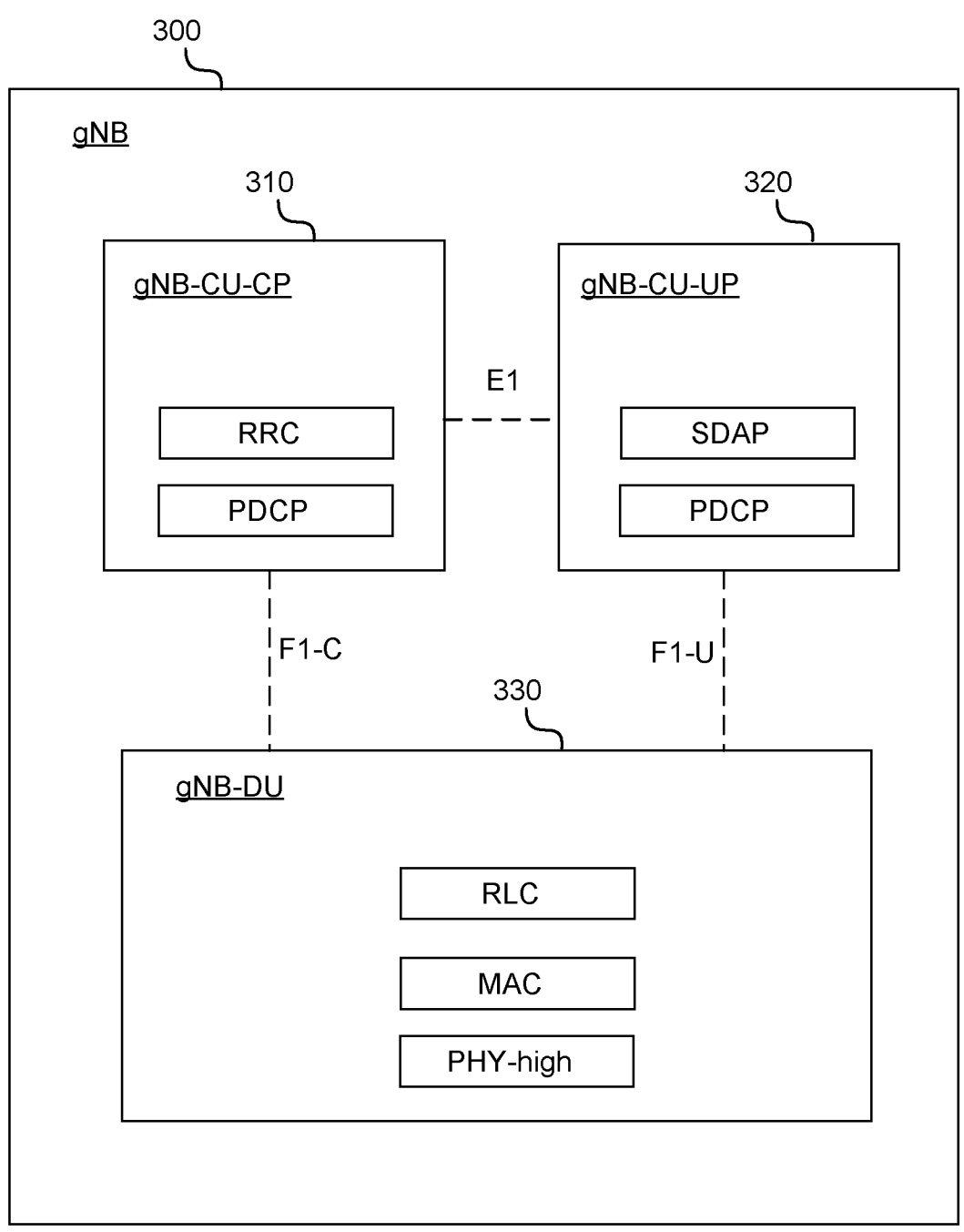
FIG. 3 shows an example embodiment of the subject matter described herein illustrating an example network node device, where various embodiments of the present disclosure may be implemented.

The network node device 300 is logically split into centralized baseband units and distributed radio units. More specifically, as shown in FIG. 3, the network node device 300 may be logically split into a gNB-central unit (gNB-CU) and one or more gNB-distributed units (gNB-DU) 330. Furthermore, the gNB-CU may be logically split into a control plane (CP) part or entity (gNB-CU-CP) 310 and one or more user plane (UP) parts or entities (gNB-CU-UP) 320. Accordingly, the 5G gNB 300 may provide 5G user plane and control plane protocol termination towards the client device 200. UP may be used to carry user traffic, such as voice, and Internet traffic, whereas CP may be used to carry e.g. control messages used for signaling in the system 100.

The gNB-CU 310, 320 is a logical node that may host higher layer protocols, such as radio resource control (RRC), service data adaptation protocol (SDAP), and packet data convergence protocol (PDCP). The gNB-DUs 330 are logical nodes that may host e.g. radio link control (RLC), medium access control (MAC), and higher physical (PHY) layers.

E1 interface may be used e.g. to provide exchange of signaling information between the gNB-CU-CP 310 and the gNB-CU-UP 320. F1-C interface may be used e.g. to provide control plane inter-connection of the gNB-CU-CP 310 and the gNB-DU 330, whereas F1-U interface may be used e.g. to provide user plane inter-connection of the gNB-CU-UP 320 and the gNB-DU 330.

In the following, various example embodiments will be discussed. At least some of these example embodiments may allow small data transmission termination.

Figure 2A:
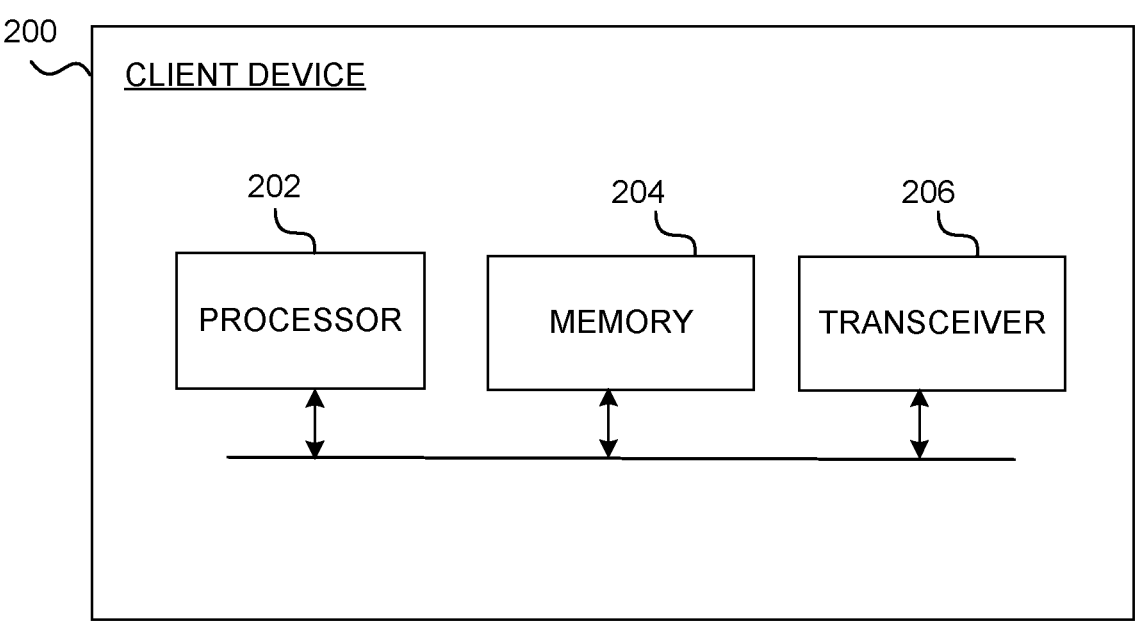
FIG. 2A shows an example embodiment of the subject matter described herein illustrating a client device.

FIG. 2A is a block diagram of the client device 210, in accordance with an example embodiment.

The client device 200 comprises one or more processors 202 and one or more memories 204 that comprise computer program code. The client device 200 may also include other elements, such as a transceiver 206, as well as other elements not shown in FIG. 2A.

Although the client device 200 is depicted to include only one processor 202, the client device 200 may include more processors. In an embodiment, the memory 204 is capable of storing instructions, such as an operating system and/or various applications. Furthermore, the memory 204 may include a storage that may be used to store e.g. at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The client device 200 may be any of various types of devices used directly by an end user entity and capable of communication in a wireless network, such as user equipment (UE). Such devices include but are not limited to smartphones, tablet computers, smart watches, lap top computers, internet-of-things (IoT) devices, massive machine-to-machine (M2M) devices, massive machine type communications (mMTC) devices, industrial internet-of-things (IIoT) devices, enhanced mobile broadband (eMBB) devices, ultra-reliable low-latency communication (URLLC) devices, etc.

The at least one memory 204 and the computer program code are configured to, with the at least one processor 202, cause the client device 200 to at least perform determining whether an ongoing small data transmission (SDT) procedure or transaction with a control plane network node device (e.g. gNB-CU-CP) 310 is to be terminated. Herein, an SDT transaction comprises one or more uplink, UL, small data transmissions. In at least some embodiments, the SDT transaction comprises one or more successive uplink, UL, small data transmissions. That is, the SDT transaction may include successive delivery of individual UL SDT packets via more than one UL small data transmissions. Herein, such an SDT transaction that comprises one or more UL small data transmissions is also called an SDT transaction or a multi-shot SDT transaction. Herein, the terms SDT transaction and SDT procedure are used interchangeably.

For example, the at least one memory 204 and the computer program code may be configured to, with the at least one processor 202, cause the client device 200 to perform the determining of whether the ongoing SDT transaction is to be terminated based on buffer status information (e.g. the amount of data in a buffer), running applications information (which may be used determine whether further data is expected to arrive in the buffer soon or not), and/or small data transmissions historical information (e.g. about the number of performed uplink small data transmissions).

In response to determining that the ongoing SDT transaction is to be terminated, the at least one memory 204 and the computer program code are further configured to, with the at least one processor 202, cause the client device 200 to at least perform forwarding to the control plane network node device 310 a radio resource control (RRC) message that comprises termination information related to the determined termination of the ongoing SDT transaction. For example, the RRC message may comprise a UEAssistanceInformation message. Alternatively, a new message (e.g. an SDT termination message) may be used as the RRC message. The RRC message may be included in an uplink small data transmission to the control plane network node device 310.

In response to determining that the ongoing SDT transaction is not to be terminated, the at least one memory 204 and the computer program code may be further configured to, with the at least one processor 202, cause the client device 200 to at least perform sending an uplink small data transmission to the control plane network node device 310 without including or sending an RRC message.

For example, the termination information may comprise an SDT termination preference or an SDT termination indication. In at least some embodiments, the SDT termination preference may be included in an SDTEndPreference information element (IE) indicating the client device 200 preference to terminate the SDT transaction.

For example, the RRC message may be sent with the last UL small data transmission of the ongoing SDT transaction or the RRC message may be sent on its own. For example, sending the RRC message on its own may comprise sending the RRC message via an UL small data transmission of the ongoing SDT transaction that does not include a payload of the last UL small data transmission.

In at least some embodiments, the at least one memory 204 and the computer program code may be further configured to, with the at least one processor 202, cause the client device 200 to at least perform differentiating the RRC message indicating the termination of the ongoing SDT transaction via a message type used for the RRC message or via inclusion of additional termination information in the RRC message.

For example, the client device 200 may send an RRC message embedded in any uplink small data transmission (i.e. not only in the first uplink small data transmission and/or the last uplink small data transmission). In this embodiment, the client device 200 may differentiate between the RRC message to be generated for the last uplink small data transmission and any of the other uplink small data transmissions. The difference may be e.g. in the type of message generated, such that for all small data transmissions but last one a resume request message may be used, and for the last small data transmission a UEAssistanceInformation message may be used. Alternatively, the client device 200 may use an extended resume request message (or another RRC message defined to initiate SDT) also for the last small data transmission, but in the last small data transmission the client device 200 may include additional information in the message about the preference for the SDT termination.

In at least some embodiments, the at least one memory 204 and the computer program code may be further configured to, with the at least one processor 202, cause the client device 200 to at least perform receiving an RRC release message from the control plane network node device 310 after sending the RRC message comprising the termination information, and initiating a transition of the client device 200 to an inactive state of RRC.

Figure 2B:
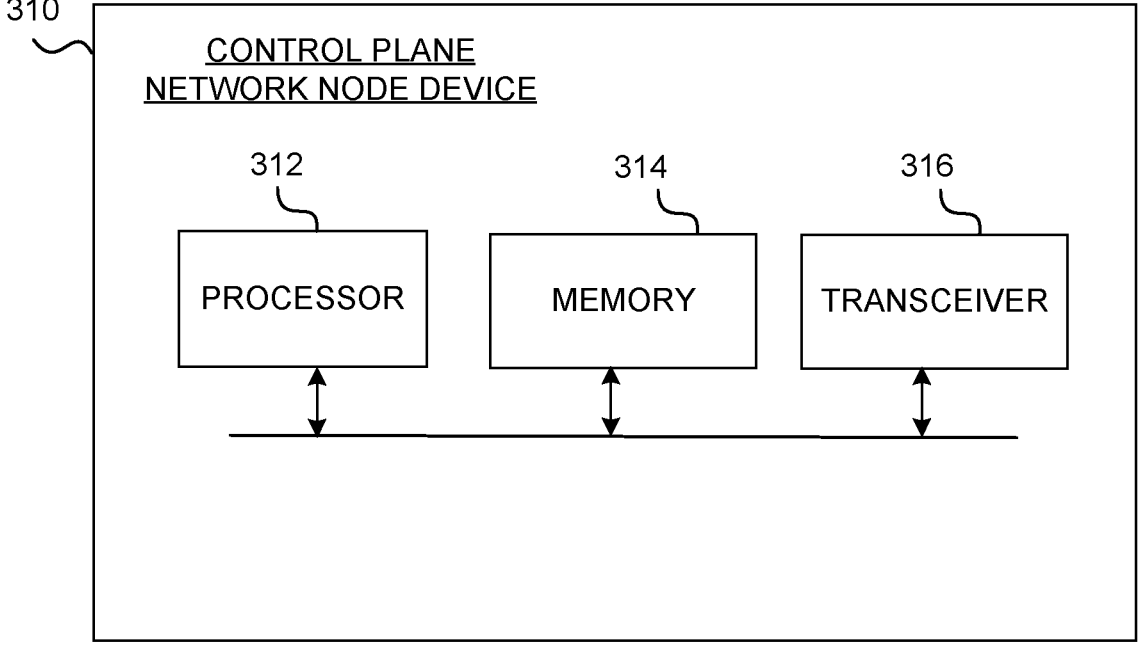
FIG. 2B shows an example embodiment of the subject matter described herein illustrating a control plane network node device.

FIG. 2B is a block diagram of a control plane network node device (e.g. gNB-CU-CP) 310, in accordance with an example embodiment.

The control plane network node device 310 comprises at least one processor 312 and at least one memory 314 including computer program code. The control plane network node device 310 may also include other elements, such as a transceiver 316.

Although the control plane network node device 310 is depicted to include only one processor 312, the control plane network node device 310 may include more processors. In an embodiment, the memory 314 is capable of storing instructions, such as an operating system and/or various applications. Furthermore, the memory 314 may include a storage that may be used to store e.g. at least some of the information and data used in the disclosed embodiments.

Furthermore, the processor 312 is capable of executing the stored instructions. In an embodiment, the processor 312 may be embodied as a multi-core processor, a single core processor, or a combination of one or more multi-core processors and one or more single core processors. For example, the processor 312 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 312 may be configured to execute hard-coded functionality. In an embodiment, the processor 312 is embodied as an executor of software instructions, wherein the instructions may specifically configure the processor 312 to perform the algorithms and/or operations described herein when the instructions are executed.

The memory 314 may be embodied as one or more volatile memory devices, one or more non-volatile memory devices, and/or a combination of one or more volatile memory devices and non-volatile memory devices. For example, the memory 314 may be embodied as semiconductor memories (such as mask ROM, PROM (programmable ROM), EPROM (erasable PROM), flash ROM, RAM (random access memory), etc.).

As discussed above in connection with FIG. 3, the control plane network node device 310 may be a logical part of the base station 300. The base station 300 may include e.g. a fifth-generation base station (gNB) or any such device providing an air interface for client devices to connect to the wireless network via wireless transmissions.

The at least one memory 314 and the computer program code are configured to, with the at least one processor 312, cause the control plane network node device 310 to at least perform receiving from the client device 200 the RRC message comprising the termination information related to the termination of the ongoing SDT transaction comprising one or more UL small data transmissions with the client device 200.

The at least one memory 314 and the computer program code are further configured to, with the at least one processor 312, cause the control plane network node device 310 to at least perform initiating a termination procedure to terminate the ongoing SDT transaction, based on the received termination information. For example, the termination procedure may comprise generating and sending an RRC release message to the client device 200, sending a resource release indication to the user plane network node device 320 (e.g. gNB-CU-UP) associated with the control plane network node device 310, or triggering a last serving control plane network node device to generate and send the RRC release message to the client device 200 due to the termination of the ongoing SDT transaction. For example, the triggering of the last serving control plane network node device may comprise one of: sending to the last serving control plane network node device an inter-CU-CP message (e.g. an Xn application protocol (XnAP) message) including the RRC message received from the client device 200, or sending to the last serving control plane network node device an inter-CU-CP message (e.g. an Xn application protocol (XnAP) message) including an indication of the termination of the ongoing SDT transaction.

In at least some embodiments, the RRC release message to the client device 200 may comprise suspend information, and the at least one memory 314 and the computer program code may be further configured to, with the at least one processor 312, cause the control plane network node device 310 to perform the sending of the RRC release message by sending the RRC release message in a CU-DU interface message (e.g. in an F1-C interface message) to a network node device distributed unit (e.g. gNB-DU) 330 associated with the control plane network node device 310 for forwarding to the client device 200, wherein the CU-DU interface message (such as the F1-C interface message) indicates the release of a context in downlink and/or it indicates the termination of the ongoing SDT transaction.

In other words, upon receiving the information about the preference to terminate the SDT from the client device 200 via RRC the message, the control plane network node device 310 may generate an RRC release message with suspend information towards the client device 200, which it may deliver to the client device 200 via the network node device distributed unit 330. In case of an inter-gNB SDT without anchor relocation, an anchor gNB may be in control of the SDT termination. Thus, the target CU-CP can send a message over an Xn interface to inform the anchor gNB-CU-CP about the information related to the SDT termination (e.g. by forwarding the received RRC message or by forwarding at least the information related to SDT termination) and the anchor CU-CP may then generate an RRC release message with suspend information towards the client device 200, which it may deliver towards the client device 200 via the target CU-CP.

In at least some embodiments, resource release may be triggered by the control plane network node device 310 and performed at the corresponding logical entities (gNB-DU 330, gNB-CU-CP 310, and gNB-CU-UP 320) after the SDT completion. The release of the resources in the CU-UP may take place after the CU-UP has delivered DL (downlink) packets that may be buffered.

Further features (such as those related to the received RRC message, the termination information and the ongoing SDT transaction) of the control plane network node device 310 directly result from the functionalities and parameters of the client device 200 and thus are not repeated here.

In other words, the disclosure allows the client device 200 to determine when an ongoing multi-shot SDT transaction can be ended based e.g. on information on buffer data amount and/or information on running applications. When the determination is negative (e.g. more data is available or expected soon), the disclosure allows the client device 200 to send an UL small data transmission that does not contain an RRC message. On the other hand, when the determination is positive (e.g. the client device 200 prefers to end the SDT transaction), the disclosure allows the client device 200 to generate an RRC message including information e.g. about its preference for the SDT transaction termination, which the client device 200 may send e.g. along with the last UL small data transmission or on its own. In a RAN split architecture, the RRC message including the information related to the SDT transaction termination may be delivered to the target gNB-CU-CP 310 via the gNB-DU 330, where the gNB-DU 330 may be unaware of the information (i.e. the disclosure allows a DU-transparent approach for SDT termination indication). In turn, this allows the gNB-CU-CP 310 to timely be aware of the need to end the SDT transaction and to trigger the generation of e.g. the RRC release message with suspend information, e.g. to be forwarded via the gNB-DU 330 towards the client device 200. This may conclude the SDT transaction and move the client device 200 back to RRC inactive state as soon as possible and enable some power saving such as PDCCH monitoring.

Figure 4:
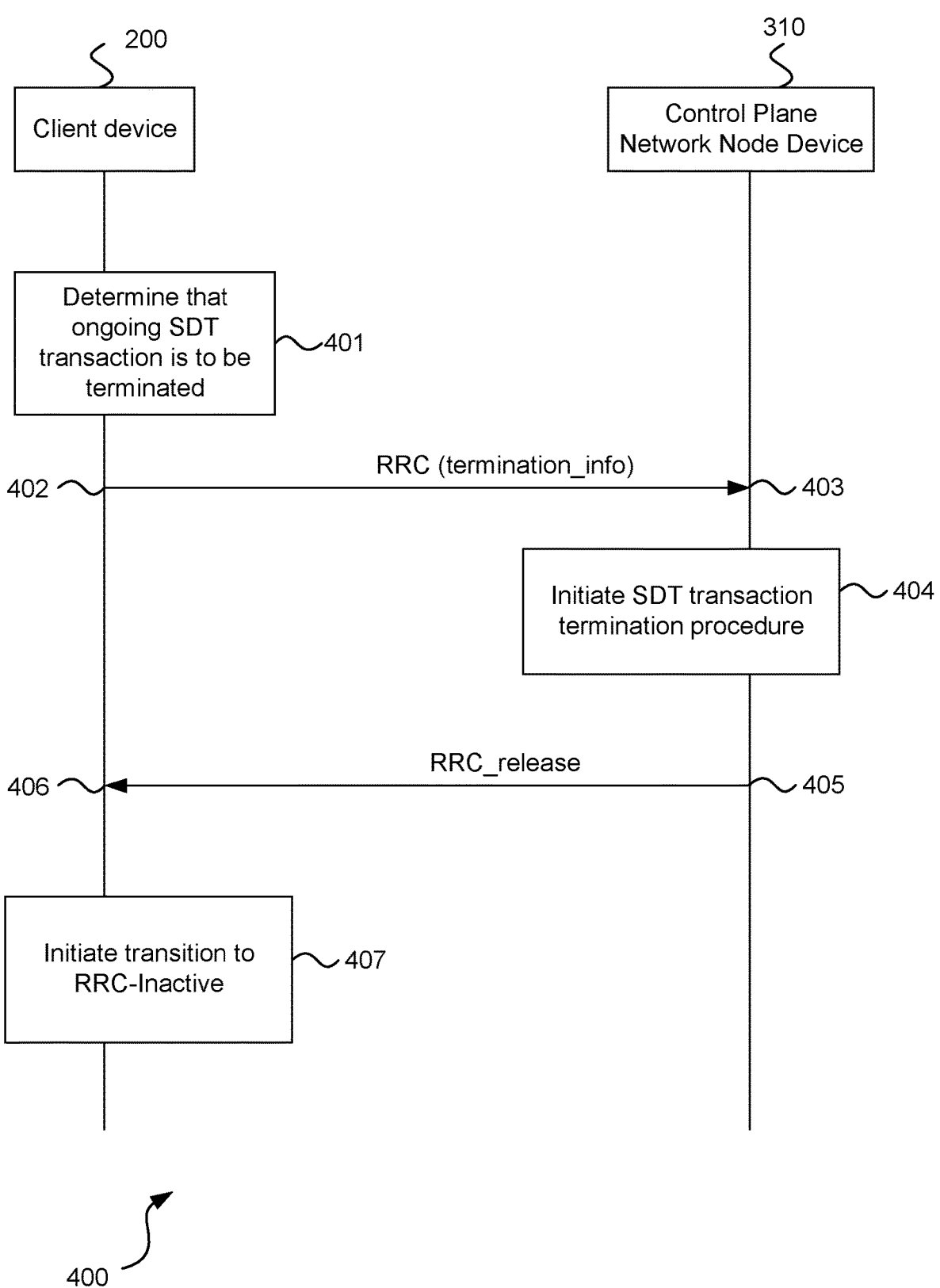
FIG. 4 shows an example embodiment of the subject matter described herein illustrating a method.

FIG. 4 illustrates an example signalling diagram 400 of a method, in accordance with an example embodiment.

At operation 401, the client device 200 determines whether an ongoing small data transmission, SDT, transaction comprising one or more UL small data transmissions with a control plane network node device is to be terminated.

In response to determining that the ongoing SDT transaction is to be terminated, an RRC message comprising termination information related to the determined termination of the ongoing SDT transaction is forwarded from the client device 200 to the control plane network node device 310, operation 402.

At operation 403, the RRC message comprising the termination information related to the determined termination of the ongoing SDT transaction is received at the control plane network node device 310.

At operation 404, the control plane network node device 310 initiates a termination procedure to terminate the ongoing SDT transaction, based on the received termination information. In the example embodiment of FIG. 4, the termination procedure comprises generating and sending an RRC release message to the client device 200, operation 405. Alternatively, the termination procedure may comprise sending a resource release indication to the user plane network node device 320 associated with the control plane network node device 310, or triggering a last serving control plane network node device to generate and send the RRC release message to the client device 200 due to the termination of the ongoing SDT transaction.

At optional operation 406, the RRC release message is received at the client device 200. At optional operation 407, the client device 200 initiates a transition of the client device 200 to an inactive state of RRC.

The method of diagram 400 may be performed by the client device 200 of FIG. 2A and the control plane network node device 310 of FIG. 2B. The operations 401, 402, 406, 407 can, for example, be performed by the at least one processor 202 and the at least one memory 204. The operations 403, 404, 405 can, for example, be performed by the at least one processor 312 and the at least one memory 314. Further features of the method of diagram 400 directly result from the functionalities and parameters of the client device 200 and the control plane network node device 310, and thus are not repeated here. The method of diagram 400 can be performed by computer program(s).

Figure 5:
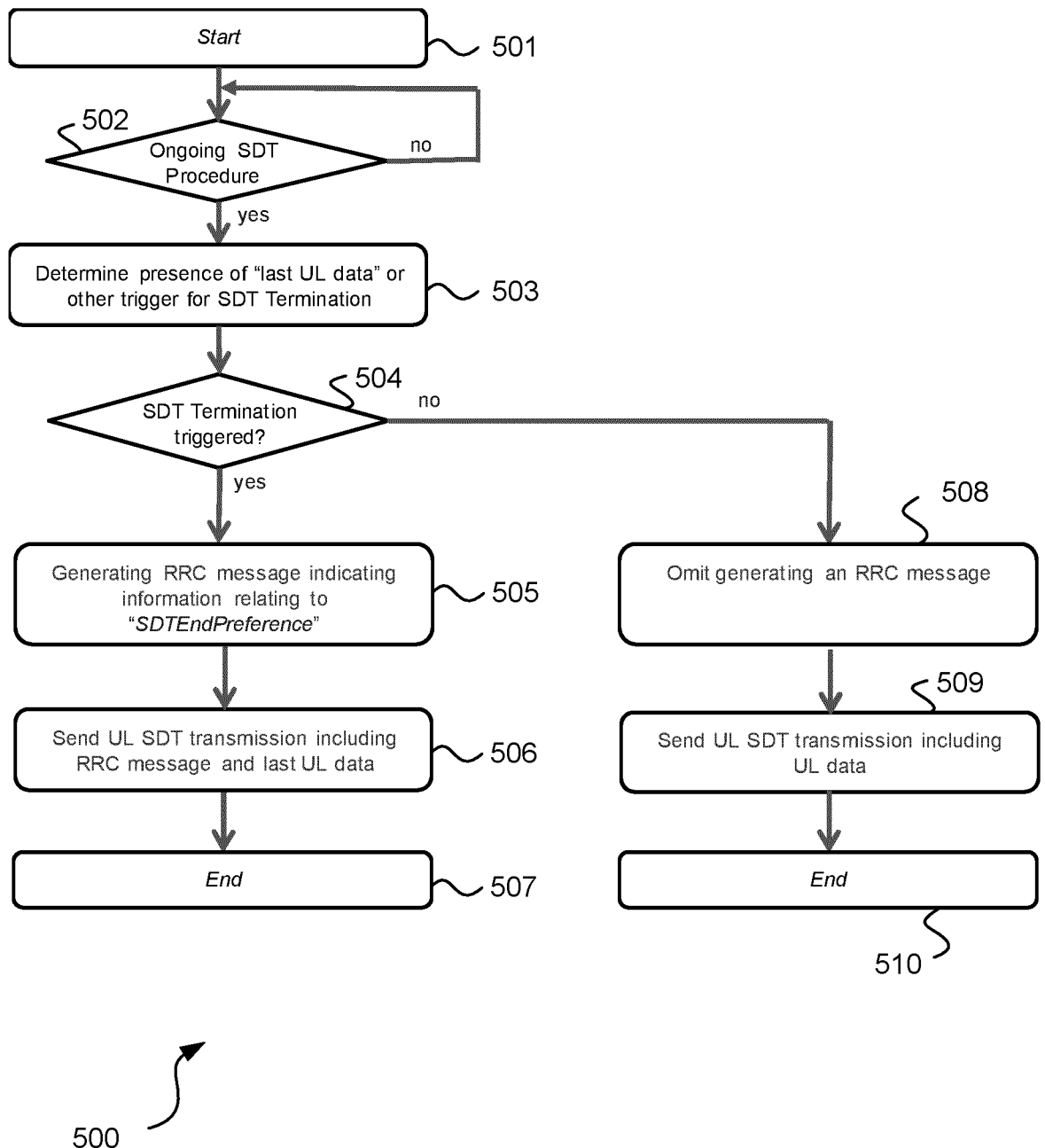
FIG. 5 shows an example embodiment of the subject matter described herein illustrating another method.

FIG. 5 illustrates an example flow chart 500 of a method of the determination of the termination of the SDT transaction at the client device 200 and the corresponding generation of the RRC message indicating termination of the SDT transaction by the client device 200, in accordance with an example embodiment.

The method of flow chart 500 starts at operation 501. At operation 502, the client device 200 determines whether there is an ongoing SDT procedure or transaction. If yes, the method proceeds to operation 503 in which the client device 200 determines whether it prefers SDT termination (e.g. if current uplink data is determined to be the last data in the buffer and no further data is expected to arrive in the buffer soon based on running applications). Other triggers for the SDT termination can include or be based on e.g. UE power saving objectives, and/or latency objectives. That is, the client device 200 may prefer to move back to the RRC inactive state immediately to save power, e.g. avoiding performing additional PDCCH monitoring, if latency targets allow for it.

If the SDT termination is triggered at operation 504, an RRC message comprising termination information related to the determined termination of the ongoing SDT transaction is generated, operation 506, and sent from the client device 200 to the control plane network node device 310, operation 506, after which the method ends at operation 507.

If the SDT termination is not triggered at operation 504, generating the RRC message is omitted, operation 508. At operation 509, the client device 200 sends an uplink small data transmission to the control plane network node device 310 including uplink data but not including the RRC message, after which the method ends at operation 510.

Figure 6:
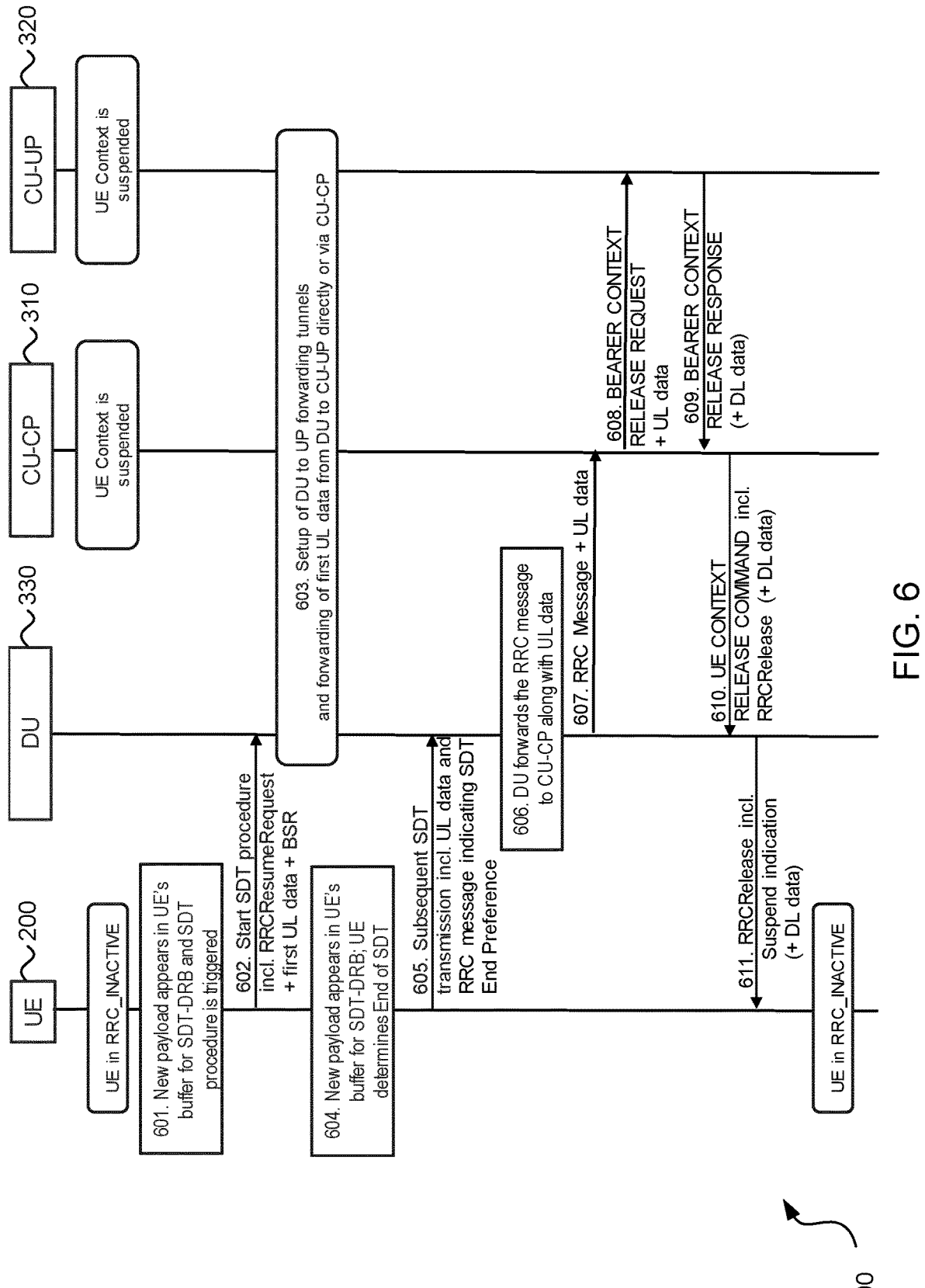
FIG. 6 shows an example embodiment of the subject matter described herein illustrating yet another method.

FIG. 6 illustrates an example signalling chart 600 of a method for an intra-gNB SDT case, in accordance with an example embodiment. As shown in FIG. 6, at the beginning, the client device 200 is in the RRC_INACTIVE state, and a UE context is suspended at the control plane network node device 310 and the user plane network node device 320.

At operation 601, a new payload appears in a buffer of the client device 200 for SDT-DRB (data radio bearer, DRB), triggering the SDT procedure.

At operations 602-603, the target gNB-DU 330 receiving the first small data transmission from the client device 200 communicates with the target gNB-CU-CP 310 via the F1-C interface in order to acquire the UE context (e.g. an uplink TEID (tunnel endpoint identifier) address) and establishes downlink and uplink forwarding F1-U tunnels for the SDT DRB of the client device 200 towards the target gNB-CU-UP 310. The DU 330 may establish the UE context using a received I-RNTI (inactive radio network temporary identifier) as a key, and retain the UE context until the end of the SDT procedure.

At operation 604, the client device 200 detects the need to perform a subsequent uplink small data transmission to the target gNB-DU 330 as part of the same SDT procedure, i.e. without a switch to the RRC connected state. For example, the first small data transmission may already have indicated the presence of additional data in the buffer via e.g. a buffer status report (BSR), or the client device 200 may indicate the presence of further data after the first small data transmission. When the client device 200 detects the need to perform a subsequent uplink small data transmission to the target gNB-DU 330, the client device 200 determines whether it prefers SDT termination (e.g. according to the flow chart of FIG. 5).

At operation 605, the client device 200 determines that it prefers the SDT termination, and sends an RRC message in the small data transmission indicating a request to terminate the ongoing SDT procedure.

At operation 606, upon reception of the small data transmission built at operation 605 and including the RRC message, the gNB-DU 330 forwards the RRC message embedded in the transmission to the CU-CP 310 using the F1-C interface and forwards the uplink data along over the F1-C interface. Alternatively, the uplink data may be sent to the CU-UP 320.

At operations 607-610, the reception of the RRC message indicating the information related to the termination of the SDT transaction causes the CU-CP 310 to generate and send a RRC release message with suspend information to the client device 200 via the DU 330. The RRC release message to the client device 200 can be sent along with a F1-C UE context release command. The reception of the RRC message also causes the CU-CP 310 to initiate the resource release indications to CU-UP 320 (via e.g. a bearer context release request) and DU 330 (via e.g. the F1-C UE context release command). If the DU 330 sent the uplink data also to the CU-CP 310, the CU-CP 310 will forward the uplink data to the CU-UP 320 over the E1 interface before releasing the resources of the CU UP 320. The CU-UP may send remaining DL data before the release of resources.

At operation 611, upon reception of the RRC release message, the client device 200 ends the SDT procedure on its side and the client device 200 is moved back to the RRC Inactive state.

The signaling for an inter-gNB SDT without the anchor relocation may be similar to that of FIG. 6, except that it may involve an additional Xn interface procedure to trigger the generation of the RRC release message at the anchor gNB and the delivery of that to the client device 200.

At least some of the embodiments described herein may allow small data transmission termination. At least some of the embodiments described herein may allow a control plane network node device in a RAN split architecture to terminate an ongoing multishot SDT transaction whenever needed.

The functionality described herein can be performed, at least in part, by one or more computer program product components such as software components. According to an embodiment, the control plane network node device 310 and/or client device 200 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A client device, comprising:
at least one processor; and
at least one memory including computer program code,
wherein the at least one memory and the computer program code are configured to, with the at least one processor, cause the client device to at least perform:
determining whether an ongoing small data transmission (SDT) transaction comprising one or more uplink (UL) small data transmissions with a control plane network node device is to be terminated, wherein the determining is based on:
buffer status information of an uplink buffer of the client device,
information related to applications running on the client device,
historical information related to the SDT,
a power saving objective of the client device, and
a latency objective for the one or more UL small data transmissions;
in response to determining that the ongoing SDT transaction is to be terminated:
transmitting, to the control plane network node device, a radio resource control (RRC) message for terminating the ongoing SDT transaction, wherein the RRC message is a UEAssistanceInformation message that includes termination information indicating a preference to terminate the SDT transaction, wherein the transmitting comprises one of:
transmitting the RRC message with a last UL SDT of the ongoing SDT transaction; or
transmitting the RRC message independently as a UL SDT that excludes any user data payload;

receiving, from the control plane network node device, an RRC release message in response to the transmitted RRC message; and
initiating, based on the RRC release message, a transition of the client device to an RRC_INACTIVE state; and
in response to determining that the ongoing SDT transaction is not to be terminated, transmitting, to the control plane network node device, a subsequent UL SDT without including the RRC message.

2. The client device according to claim 1, wherein the termination information comprises one of an SDT termination preference and an SDT termination indication.

3. A control plane network node device, comprising:
at least one processor; and
at least one memory including computer program code,
wherein the at least one memory and the computer program code are configured to, with the at least one processor, cause the control plane network node device to at least perform:
receiving, from a client device;
a radio resource control (RRC) message included within an uplink (UL) small data transmission (SDT), the RRC message comprising termination information indicating a preference of the client device to terminate an ongoing multi-shot SDT transaction, wherein the RRC message is a UEAssistanceInformation message;
in response to receiving, from the client device, the RRC message, initiating a termination procedure to terminate the ongoing SDT transaction, and wherein the termination procedure comprises one of:
transmitting, to a network node device distributed unit associated with the control plane network node device, an RRC release message comprising suspend information within a CU-DU interface message that indicates a UE context release command or a termination of the ongoing SDT transaction; or
triggering a last serving control plane network node device to generate and transmit the RRC release message to the client device upon the termination of the ongoing SDT transaction, wherein the triggering of the last serving control plane network node device comprises one of:
transmitting to the last serving control plane network node device an inter-CU-CP message including the RRC message received from the client device; or
transmitting to the last serving control plane network node device an inter-CU-CP message including an indication of the termination of the ongoing SDT transaction; and
in response to receiving, from the client device, the UL SDT that does not include the RRC message, continuing the ongoing SDT transaction by refraining from initiating the termination procedure.

* * * * *